March 25, 1924.     1,488,130
L. D'ONOFRIO
MACHINE FOR MAKING CAKES OR WAFERS OF TOILET POWDER
Filed July 13, 1922     4 Sheets-Sheet 1

Inventor
Luigi D'Onofrio
By his Attorney
William F. Nickel

March 25, 1924. 1,488,130
L. D'ONOFRIO
MACHINE FOR MAKING CAKES OR WAFERS OF TOILET POWDER
Filed July 13, 1922 4 Sheets-Sheet 2

Witness
M. E. Lessin

Inventor
Luigi D'Onofrio
By his Attorney
William F. Nickel

March 25, 1924.

L. D'ONOFRIO 1,488,130

MACHINE FOR MAKING CAKES OR WAFERS OF TOILET POWDER

Filed July 13, 1922    4 Sheets-Sheet 3

Inventor
Luigi D'Onofrio
By his Attorney
William F. Nickel

March 25, 1924.  L. D'ONOFRIO  1,488,130
MACHINE FOR MAKING CAKES OR WAFERS OF TOILET POWDER
Filed July 13, 1922    4 Sheets-Sheet 4

Patented Mar. 25, 1924.

1,488,130

UNITED STATES PATENT OFFICE.

LUIGI D'ONOFRIO, OF NEW YORK, N. Y., ASSIGNOR OF ONE-THIRD TO CARLO DALBONI AND ONE-THIRD TO ANTONIO NOCITO, BOTH OF NEW YORK, N. Y.

MACHINE FOR MAKING CAKES OR WAFERS OF TOILET POWDER.

Application filed July 13, 1922. Serial No. 574,718.

*To all whom it may concern:*

Be it known that I, LUIGI D'ONOFRIO, a subject of the King of Italy, residing in New York city, in the county and State of New York, have invented certain new and useful Improvements in Machines for Making Cakes or Wafers of Toilet Powder, of which the following is a specification.

My invention relates to mechanism for producing or manufacturing objects or bodies having a definite size and shape, from materials in an advanced state of division; particularly a machine of the kind set forth in my application for a patent on a molding machine, Serial No. 478908, filed June 20th, 1921, and allowed Jan. 17th, 1922, for working a predetermined quantity of comminuted or pulverized material, such as face or toilet powder, into the form of a cake or wafer of such a character that an ordinary toilet puff can be rubbed upon it, and thus made to take up enough powder to be applied to the skin of the user to give the desired effect.

An object of this invention is to provide a machine which will not only impart to the cake or wafer the required size and form, but which will also securely attach the cake, in the course of manufacturing same, to a suitable rigid disk or base that will enable the cake to be held together and prevent the breaking or crumbling or disintegration of it when it is being packed, shipped, or used; thereby enabling the cake or wafer to retain its form and to be completely consumed in the intended manner.

This and other objects and advantages of my invention are more fully set forth in the following description, taken with the accompanying drawings, which show the best embodiment of the invention now known to me; and the novel features thereof are precisely defined in the appended claims. The disclosure, however, is explanatory or illustrative only, and I may make changes in the structure actually shown herein, especially as to the shape, size and arrangement of the various parts, without departing from the scope and spirit of the invention as indicated by the broad and general meanings of the terms in which the claims are expressed.

On the drawings:

Figure 8 is a front view of a scraper blade and other parts therefor;

Figure 9 is a top view of a feed plate for the disks or base to which the cakes are attached; shown in part;

The same numerals identify the same parts throughout.

The machine comprises a frame-work 1 upon which are mounted the operating parts; this frame-work comprising longitudinal beams 2 on each side at the top, supported by legs 3, the beams 2 and legs 3 being connected by cross bars 4. Each of the beams 2 carries a rail 5, these rails being parallel and extending lengthwise of the machine and being preferably in the form of channel bars, so placed that the channels or slots therein are presented toward each other. The channels of the rails 5 receive the ends of carriers 6 which extend across the frame-work 1 and move along the rails from one end to the other. To actuate these carriers a conveyor 7 is disposed at each side of the machine, each conveyor constituted of an endless chain or belt, to which the ends of the carriers are attached. The carriers 6 each bear a number of receivers 8 to receive disks 9 from receptacles in the form of tubes 10, which constitute magazines in which the disks are placed. These disks are delivered one to each receiver; and beyond the tubes 10 is a container for an adhesive such as a glue box 11. This glue box is movable, and acts both to apply a coating of glue to the top face of each disk as it is delivered from the magazines 10, and then to transfer the disks to the receivers 8 of the carriers 6. After the disks are thus coated and then disposed in the receivers 8, the conveyors move the carriers 6 and the receivers 8 along the frame-work 1 to a hopper 12 which contains the powder from which the cakes are to be made. From the hopper this powder is discharged into the receivers 8 on top of disks 9, and the excess is removed by a blade or element 13, as each carrier moves beneath the hopper in continuation of its travel from one end of the machine to the other. Each carrier finally reaches the dies 14, which mold and compress the powder in the receivers 8 into shape. Upon completion of the operation the disks with the cakes thereon are removed from the machine at the end opposite where the tubes 10 are located.

The conveyors 7 pass over wheels such as sprockets 15, located at each end of the frame-work 1 and mounted on shafts in suitably attached bearings; and after leaving the dies 14 the carriers 6 pass out of the ends of the channels in rails 5, and are returned by the conveyors 7 below the rails 5 back to the starting point; where their ends again enter the slots or channels in the rails, so that the operation can be repeated. At each side of the machine, preferably adjacent the end where the tubes 10 are placed, is a reciprocating shaft 16 mounted to move in horizontal guides or bearings 17, supported by the legs 3. On each of these shafts are pivoted one-way acting pawls 18, engaged by springs 19, and 20 is a slotted crossbar on each shaft, engaged by the pin of a crank 21, which rotates and moves the shaft back and forth in the guides 17. The ends of the carriers 6 will be engaged by the pawls whenever the shafts 16 move to the right; so as to actuate the conveyors and make them transport the carriers 6 as required; and when the members 16 move to the left the pawls 18, as they strike the extremities of the carriers 6 will yield, so as to permit them to pass the carriers without effect. The cranks are mounted on a shaft 22, which rotates in bearings on bars 23 affixed to the legs 3; and the shaft 22 will carry a gear 24 so that it can be turned. Of course the shafts 16 will be at such a level below the top of the frame-work that the pawls 18 will take effect on only the lower section of the conveyors, which are moving the carriers 6 back into re-engagement with the rails 5.

Each carrier will consist of a block 25, from the upper face of which extends circular projections or bosses 26. Above the bar 25 will be a plate 27 having openings 28, from the edges of which extend annular bosses or sleeves 29 which receive the projections 26. The projections 26 and sleeves 29 constitute the receivers 8, the top of the projections being the bottoms of the receivers and the sleeves 29 forming movable sections making with the projections 26 a cup or pocket. To the opposite sides of each block or bar 25 are attached spring arms 30, which extend upward and press against the opposite edges of the plate 27. These resilient arms grip the plates 27 with sufficient tightness to hold them in either raised or lowered position; permitting these plates to be moved or depressed as required in the practice of the invention.

The tubes or magazines 10 are attached to a metal strap or band 31 which spans the rails 5 some distance above them. Each of the tubes is open at its lower end but immediately below the tubes is a member 32 which alternately closes their lower extremities and delivers the disks 9 therefrom. This member 32 may be made up of two plates 33 and 34, the plate 34 being below the plate 33 and extending beyond the edge of it; the edge of the plate 33 thus forming a shoulder; and in the edge of this plate are recesses 35, preferably triangular in shape. The member 32 moves on longitudinal strips 36 above the rails 5. Springs 37 secured to the ends of the member 32 and to a convenient fixed point, normally tend to draw this member in such direction as to bring recesses 35 under tubes 10, and cams 38 on a shaft 39 are provided at each side of the machine to actuate the member in the opposite direction. Obviously when the recesses 35 come beneath the tubes 10 a disk will drop out from each tube. Of course the top plate 33 must be no thicker than one of the disks, so that no more than one disk will be delivered from each tube for every movement of the member produced by the cams 38. The shaft 39 turns in bearings on post 40.

Glue box 11 moves up and down and its opposite ends are bearings 41 to engage vertical guides 42 on the frame-work 1. Springs 43 between the bearings 41 and the rails 5 urge the box upward. In the bottom of this box are outlet nozzles 44, the mouths of which are covered with perforated plates or gauze 45, these outlets being of the same size and cross-sectional shape as the disks 9. Inside of the box 11 are plungers 46, one located at the centre of each nozzle 44 and projecting through bearings 47 in the plates 45 and similar bearings 47 in the top of the box 11. Cams 48 on a shaft 49 extending along the top of the box 11 from one side of the machine to the other strike against projections 50 on the top of the box at the ends to depress the box at intervals; and on this shaft 49 are other cams 51 for the rods 46. Normally springs 52 lift these plungers so that their lower ends will be flush with the outer face of the plates 45, the springs seating on the top of the box 11 and encircling the plungers and engaging pins through the plungers shown at 53. When the member 32 is actuated to carry the disks in the recesses 35 out from under the magazines 10 it moves these disks beneath the box 11 directly under the nozzles 44. Before the member 32 can be returned by the springs 37 the box 11 is depressed by the cams 48, and the plates 45 made to contact with the upper face of the disks 9 on member 32. As the lower faces of these plates 45 are covered with glue, the disks stick to the nozzles 44 and the box 11 on its upward movement lifts the disks. As the member 32 is withdrawn by the springs 37, one of the carriers 6 comes directly beneath the box 11; and then the box is again depressed, and this time before it rises the plungers 46 are depressed by the cams 51, thereby releasing the disks from the nozzles and causing them to drop into the receivers 8, the disks retaining enough adhesive to coat their upper faces. As each carrier moves along the rails 5 from the point where its ends enter the slot or channel of the rail until it comes into line with the nozzles 44, the plate 27 is held relatively close to the bar 25 by the spring arms 30. When, however, it comes beneath the box 11 a cam projection 54 on the rails 5 at each side of the machine engages the under face of the plate 27 at the ends thereof and lifts the plate, so as to make the sleeves 29 extend the required distance above the tops of the projections 26. Then as the disks 9 drop into the receivers the sleeves 29 project above them and surround them so that they do not fall out.

The shaft 49 rotates in bearings mounted upon plates 55, which are attached to uprights 56 secured to the rails 5 or to the beams 2. To hold the longitudinal strips 36 on which the member 32 slides, in position, I may affix the one end of each of these strips to one of the uprights 56 and the other end to the post 40. Also the supports 31 for the tubes 10 can be attached at its opposite ends to the tops of the uprights 56.

The top of the box is indicated at 57. It carries the projections 50 and may be removable. It has a number of openings 58 to enable it to be filled with glue, and it contains a feed plunger 59 to be actuated by threaded rods or stems 60 which are adjacent each end of the box and are engaged by gears 61. These gears 61 are held between projections 62 and can turn but do not move up and down. They are connected to the shaft 49 and rotate to such an extent as to make the threaded rods feed the plungers downward little by little in order to force the glue steadily out of the nozzles 44 and keep a coating on the lower faces of the plates 45.

The projections 62 may be in one piece and secured to the supports 31 for the magazines 10. They are of course apertured to let the rods 60 pass through them. The threaded rods 60 may have key-ways and the projections 62 keys 63 so that the rods can slide up and down in the projections but cannot turn; while the gears 61 on the rods 60 between the projections 62 may turn but cannot move up and down. The gears are rotated by worms 64 on a shaft 65 mounted in bearings on the plates 55 and having a gear 66, which meshes with a gear 67 which in turn is driven from a gear 68 on the shaft 49. The plunger 59 may have recesses in its ends to engage guides 69 inside, at the ends of the box. The rods 60 pass through hollow bosses 70 in the top of the box and as the box descends the rods do not follow it. But as the box rises the lower ends of these rods pass through these openings, strike the plunger 59 and force it downward to a slight extent.

Beyond the glue box 11 in the line of travel of the carriers is a support 71 spanning the rails 5, and having its ends bent down to be secured to the rails or to the beams 2. This support has a number of spouts 72 having funnel-shaped mouths, and over the mouths of these spouts is a curved hood 73 open at one side to the hopper 12; and affixed to the support 71. This hopper has standards or legs 74 at each side secured on top of the frame-work 1. Extending across the end of the hopper adjacent the hood 73 is a shaft 75, this shaft being located near the bottom of the hopper; and at 76 is a similar shaft at the opposite end of the hopper likewise above the level of the bottom. On these shafts are pulleys 77 over which pass feed belts 78; the lower portions of the belts being below the bottom of the hopper and the upper portion of the belts passing through a hole 79 in the rear end of the hopper, and above the bottom of same towards the front end. A flap of cloth 80 is secured to the rear end of the hopper above the hole 79 to prevent the powder from dropping out of the hole 79, the lower edge of this flap resting upon the top of the belts 78. Passing the lower edge of this flap 80 the tops of the belts run through an outlet 81 in the front end of the box and the size of this outlet is regulated by a gate 82 having vertical racks 83 on its outer face, at its opposite ends. On the front end of the box, mounted in bearings, is a shaft 84 having pinions 85 which engage the racks 83. The shaft has a handle 86, with a bolt 87 to pass through a slot in a quadrant 88 fixed to the hopper 12. By turning this handle the gate may be raised or lowered and by means of the quadrant the bolt 87, and a nut 89 thereon, the handle can be secured at any point to hold the gate in adjusted position. The forward shaft 75 is turned to move the belt and is connected to gearing which actuates it intermittently whenever one of the carriers is beneath the spouts 72, just enough to discharge the quantity of powder required to fill the receivers 8 and cover the disks 9.

After taking the charge of powder from the hopper 12, the receivers 8 are moved beneath the hopper towards the dies 14. Extending between the standards 74 is an element such as a vertical blade 13 having arms 90 extending along the rails 5 toward the spouts 72. The lower edges of these arms are inclined in downward direction from their outer ends toward the element 13, and edges 91 are at such height above the rails 5 that, as each carrier 6 passes under the blade 13, the parts 90 will engage the opposite ends of the plate 27 and force it downward to a slight extent. As the plate moves down the sleeves 29 of course move down also, and as the receivers pass under the lower edge of the blade 13, the edge of this blade will sweep off the excess contents of each receiver, reducing the charge to the required quantity, and any of the powder thus swept off by the blade 13 will be dropped into a pan 92, mounted between the beams 2, under the blade 13. The element 13 has bearings 93 engaged by vertical guides 94 affixed to the legs 74, and has racks 95, and the spindle 96 carried in bearings in the standards 74 has pinions 97 to engage these racks and raise or lower the element 90 to adjust it. One end of the spindle 96 has an operating handle 98.

After passing beneath the blade 13, the carriers reach the dies 14, which are borne by the heads 99 and 100. The dies 14 on the head 99 are forming and compressing dies and each is affixed to a stem 101 rotatably mounted in the head 99. The forming members 14 are below the head 99 and the stems pass up through the head and have fixed to their upper ends the gears 102. These gears are connected with one another and connect through gears 103 and 104 to a drive gear 105. Gears 103 and 104 may be in piece, and the gear 104, with which the gear 105 engages, may be of some height. Hence, as the head 99 rises and falls the members 14 move with it, and turn continuously because the gear 105 never leaves the gear 104. To the head 99 are attached guide pieces 106 which engage guide ways 107 in the frame-work 1 and attached to the ends of the head 99 on each side of the frame-work 1 are eccentric rods 108 operated by eccentrics 109. These eccentrics cause the head 99 to move up and down as required.

The gear 105 is fastened to the upper end of a vertical shaft 110 turning in a bearing members 111 at the top of the frame-work 1, adjacent one end of the head 99. The lower end of the shaft 110 carries fixed thereon a miter gear 112 and this gear meshes with a miter gear 113 on a horizontal shaft 114 turning in the same member 111. To the head 100 are attached the compressor dies or members 14 which are also provided with stems 101 fixed to the head 100 so that these dies do not turn but merely move up and down with the head 100. Eccentrics 109 and eccentric rods 108 are connected to each end of the head 100 and operated the same as the eccentrics and eccentric rods above mentioned operate the head 99. All the dies 14 have concave recesses 115 in their under faces.

The power to run the machine is derived from an electric motor 116 which operates a shaft 117 carrying a worm gear, not shown, to turn a gear, not shown, in a casing 118, on a shaft 119. The motor is suitably mounted on the frame-work 1, and the shaft 119 is engaged by suitable bearings at the sides of the machine. On the shaft 119 is a sprocket 120 over which runs a chain 121 to the sprocket 24, and over a sprocket 122 on this shaft runs a chain 123 to a sprocket 124 on a shaft 125 carrying the eccentrics for the head 99. This shaft 125 is also mounted in suitable bearings at the sides of the machine, and a similar shaft 126 carries the eccentrics for the head 100. A chain 127 and sprockets 128 on the shafts 124 and 125 connect these two shafts together. Another sprocket 129 on the shaft 124 bears a chain 130 running to a sprocket 131 on the shaft 114. On the shaft 119 is also a sectional gear 132 which acts to turn a gear 133 on a shaft 134. This shaft 134 has a sprocket 135 over which passes a chain 136 to a similar sprocket 137 on the shaft 75 at the front of the hopper. The shaft 75 may also carry a sprocket 138 to be connected by a chain 139 to a sprocket 140 on the shaft 49 above the top of glue box 11. The shaft 49 may have a sprocket 141 thereon to be connected by a chain 142 to a similar sprocket on the shaft 39. Then as the motor revolves the cranks 21 turn continuously and the conveyors 7 are operated step by step to move the carriers 6 into position to receive the disks; then to pass under the spouts 72; then forward under the blade 13 to pass beneath the rotatable dies 14; then beneath the compressing dies 14; and then to the ends of the rails 5 where the disks with the rouge powder molded into finished cakes on their upper faces can be removed on a tray. While the carriers are moving in this manner, the disks 9 are repeatedly delivered from the magazines 10, and transferred by the glue box 11 to the receivers 8; and the belts 78 are intermittently actuated at the proper time and to the required extent to make the hopper deliver the exact amount of powder needed to each receiver 8.

To enable the cams 38 to operate the member 32, the latter is provided with upright arms 143, rigidly attached to each side of the top of the member 32. We also make the tubes 10 so that they can be adjusted up and down in the support 31 and held in adjusted position by means of binding screws 144, engaging threaded holes in the support 31, so that they can be turned into engagement with the tubes 10. Therefore the discharge ends of the tubes 10 can be held at a greater or less distance from the member 32, according to the thickness of the disks which are employed. By making the recesses 35 triangular in shape, the disks or bases 9 automatically assume central position in these recesses, no matter what width these disks may have, so that disks of various diameters, within certain limits, can be used in the magazines 10 without changing the inside width of these tubes. Further the plate 33 can be made to operate with disks of various thicknesses by superposing thin strips on the front of this plate 33, such strips being fastened in place and provided with recesses to register with recesses 35. Such strips are not shown in the drawings, but it is obvious by the use of one or more of them, the effective thickness of the plate 33 can be varied.

Figure 1:
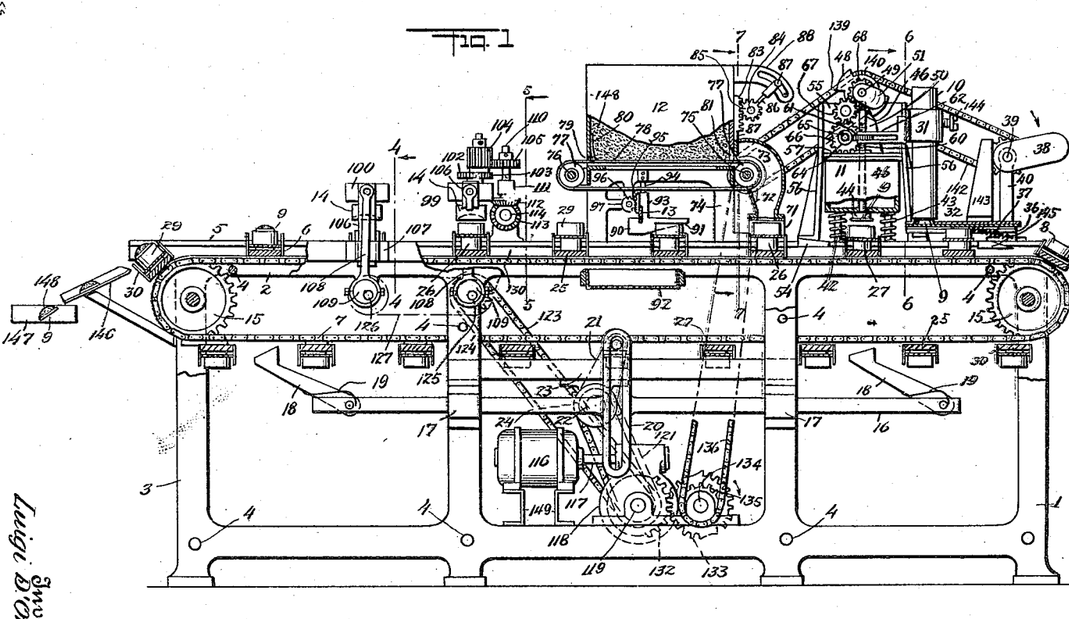
Figure 1 is a side view of a machine according to my invention, the upper part being partly in section.

On Figure 1 the upper part of the machine is shown in longitudinal section, three of the legs 3 being broken away near the upper part; and the second leg from the left in this view being continued up to the beams 2 to show a part of the rail 5 and the connections including the eccentric and the rod to raise the head 100, in full on the side towards the observer; these connections of course being the same for the head 99. The parts for supplying the bases 9, including the tubes 10, the member 32 and the gearing to operate the same are indicated in such relation on this figure that the member 32 is in its return position; with disks 9 in the recesses 35 and the cam 38 having a little over a quarter of a circle to travel before the member 32 is forced to begin its movement towards the glue box 11. The parts for applying adhesive to the disks, including the glue box 11 with its plunger 59 are shown in such position that the box 11 has begun its downward movement to deposit the bases 9 at the ends of nozzles 44 in the receivers 8. Of course the cam 48 must be a double-nosed cam, while the cams 51 for depressing the rods 56 are single-nosed cams, because the glue box must move downward twice for every actuation of the rods 46. The box acts on its first downward movement to lift the disks 9 from the member 32 and then on its next downward movement to deposit these disks in the receivers 8; the gears 61 being actuated continuously to move the threaded rods 60 downward very slowly and enable the plunger 59 to be pushed a slight degree further away from the top of the box, on each up-stroke of the box, to keep the outer faces of the plates 45 covered with a coating of adhesive; the parts for actuating the box including the cams 48 and the gearing therefor. Also the hopper 12, belts 78 and the gearing for actuating the hopper are in such position that the belts have already begun to supply rouge or other powder to the receivers 8 which have passed the glue box 11 and are underneath spouts 72, and the operation by these parts of supplying and admeasuring an apportioned or predetermined quantity of powder to the bases 9, with adhesive upon their upper faces, in the receivers 8 beneath the spouts 72 will continue until the sectional gear 132 disengages itself with the teeth on the gear 133. At the same time the receivers which have passed the scraper blade 13 and come beneath head 99 are ready to have the powder on the bases or disks molded and pressed into shape and then to be subjected to the dies 14 carried by the head 100 for the final compressing action, which finishes the product manufactured by the machine; the parts for performing this operation, including both the heads 99 and 100, the rotatable dies 14 on the former head, and the non-rotatable dies carried by the latter head, and the gearing and eccentric for operating the two heads. The dies carried by the head 99 are primarily molding or shaping dies, although they exert some pressure upon the powder; while the dies carried by the head 100 are principally pressure dies.

The shaft 119 of course acts continuously and so do the shafts 22, 125, 126 and 114; but shafts 134, the belts 78, the shafts 49 and the shafts 39 rotate intermittently only; while the teeth of the gear 132 are in engagement with the teeth on one side or the other of the gear 133. When the gear 132 is not turning the gear 133, the rods 16 are moving to the right and the eccentrics 109, which are shown in Figure 1 as having begun their down strokes, are moving upward to get into position for the downstroke. When the teeth of the gear 132 mesh with the gear 133 the eccentrics are ready to move the heads 99 and 100 downward; and the bars 16 now slide to the left, so that the conveyors 7 are stationary, while the cams 38, 51 and 48 and the glue box 11, the belts 78 and the heads 99 and 100 are in action; and when these latter parts are out of action, that is, when the belts 78 come to a stand-still and the nozzles 44 have deposited the bases 9 in the receivers 8 under them, the carriers 6 on the lower section of the conveyors 7 can be engaged by the pawls 18 and the conveyors caused to move. Of course the conveyors must be stationary, when the heads 99 and 100 are moving downward and the powder is being delivered from the hopper 12 into the spouts 72.

As shown in Figure 1 the gear 132 is smooth or cylindrical over the portion that has no teeth; and the gear 133 has two sets of teeth separated by portions which are smooth and concave and having the same curvature as the smooth portion of the gear 132. Therefore, when the teeth of the gear 132 leave either set of teeth of the gear 133, the smooth portions of these gears come together; and while the gear 132 continues rotating, the gear 133 stops until the teeth of the gear 132 again come into engagement with one set of teeth of the gear 133. Hence, while the gear 132 rotates continuously, with the shaft 119; the shaft 134 is motionless during the time the pawls 18 are moving the conveyor 7; and so are the shafts 75, 49, and 39, as will be understood.

The shafts 22, 125 and 126 may rotate in equal time with the shaft 119, and the relative rate of rotation of the shaft 114 which revolves the dies 14 on the head 99 may be selected. On account of the sectional gear 132, the shaft 134 rotates at half the speed of the shaft 119; and for every half revolution the gear 133 and shaft 134, the shafts 38 and 49 should rotate a full revolution. This result can be obtained by making the gear 137 on the shaft 75 half the size of the gear 135, and the gears 138 and 140 and 141 equal in diameter. Then, with the gears 132 and 133 in mesh, all the carriers are stationary, while the heads 99 and 100 are moving downward, the belts are feeding out of the hopper 12, and the shafts 38 and 49 make a complete revolution; the shaft 38 moving the member 32 forward once, and the box 11 going downward twice, once to lift the disks 9 and the other time to deposit the disks in the waiting receivers 8 beneath the box. As soon as the gear 133 is disengaged from the gear 132, the shafts 134, 75, 49 and 38 stop; while the shaft 119 acts through the shaft 22 to throw the bars 16 to the right to actuate the conveyors 7 and move all carriers 6 one step forward to bring the next carrier from under the member 32 in line beneath the box 11; and the eccentrics 109 move the heads 99 and 100 upward into position for the next stroke downward.

After the ends of the plates 27 engage the cams 54 and are lifted to make the sleeves 29 project their maximum distance above the bosses 26, and after the carriers move under the blade 13 and the plates 27 are adjusted by their engagement with the parts 90, they maintain such position until they reach the dies 14, which in molding and compressing the material on the disks 9 of course force down the sleeves 29 and plates 27 into the position shown at the extreme left of the machine in Figure 1. In such position the sleeves 29 are about flush with the tops of the bosses 26 so as to expose the disks 9 with the molded powder on top of them. After the disks and the rouge cakes thereon are removed from the machine, the carriers 6 on being moved back towards the end of the machine where the shaft 39 is located, carry the plates 27 in the same position because the edges of these plates are gripped and held by the spring arms 30. Upon the ends of the carriers 6 re-entering the ends of the slots of the rails 5 under the shaft 39, the ends of the plates 27 are re-engaged by cams 145 located under the member 32 and acting in the same manner as the cams 54. These cams 145 raise the plates 27 and the sleeves 29 to some extent so that the sleeves project a short distance above the bosses 26, when the disks 9 are deposited in the receivers by the box 11. All the bars 25 of the carriers are shown in cross section of Figure 1.

The portions of the plates 27 at the ends of the carriers and between the sleeves 8 act as projecting parts attached to the sleeves for enabling the sleeves to be moved on the bosses 26 when these plates are engaged by the cams 54 or 145.

Figure 2:
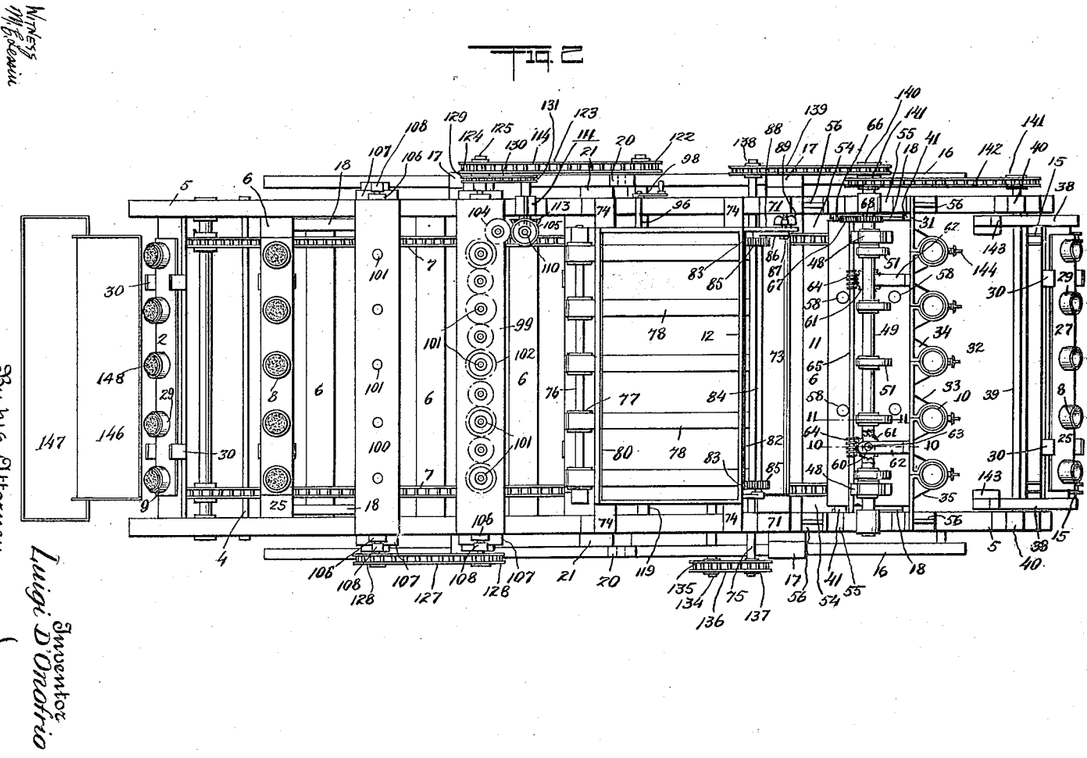
Figure 2 is a top plan of same.
Figures 3, 4, 5, 6:
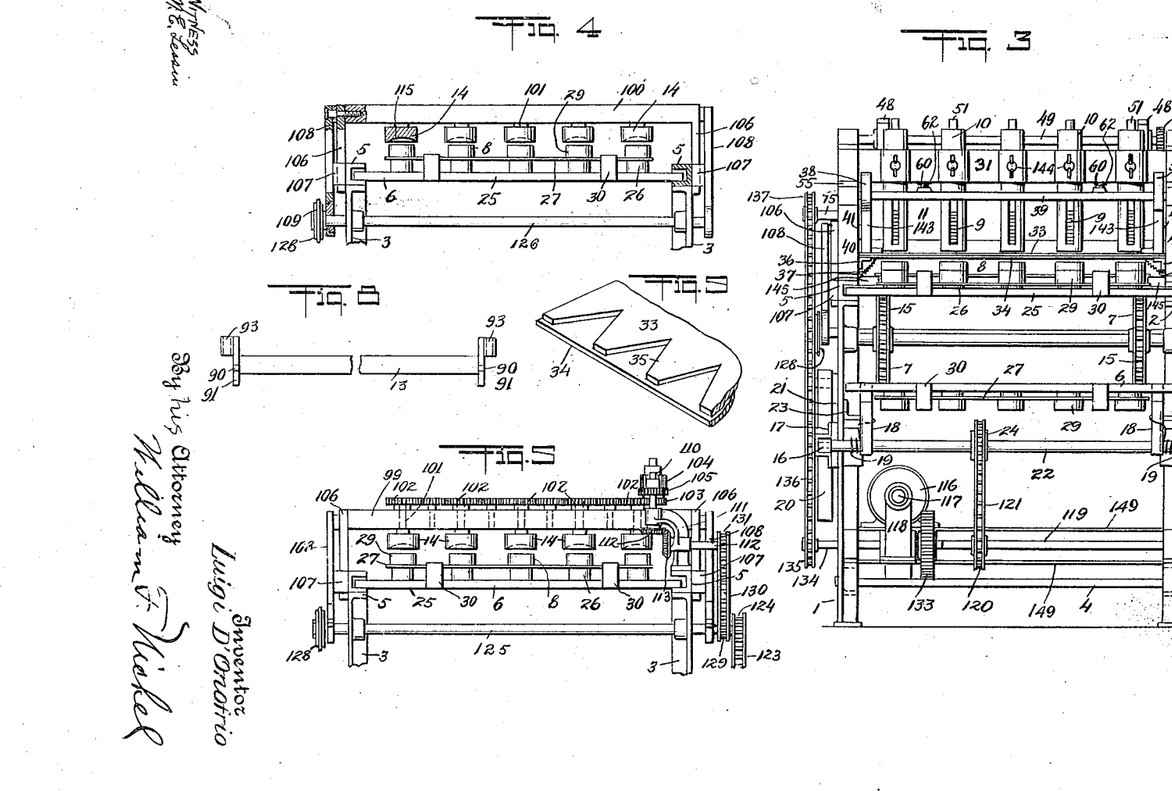
Figure 3 is an end elevation thereof, seen from the right of Figure 1.
Figure 4 is a section on the line 4—4, of Figure 1.
Figure 5 is a section on the line 5—5, of Figure 1.
Figure 6 is a section of the line 6—6 of Figure 1.
Figures 6, 10, 11:
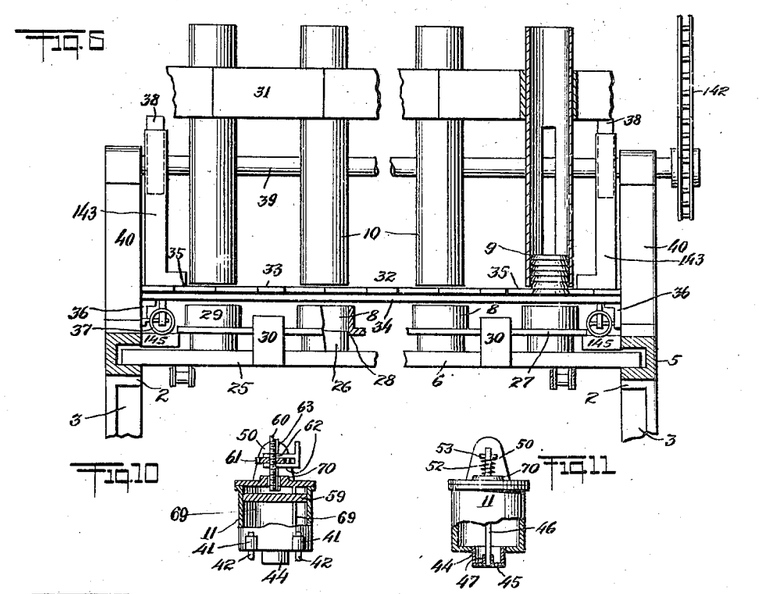
Figure 10 is a cross section of a container for an adhesive that is part of my invention; on the line 10—10 of Figure 2.
Figure 11 shows another cross section of that container; on the line 11—11 of Figure 2.
Figure 7:
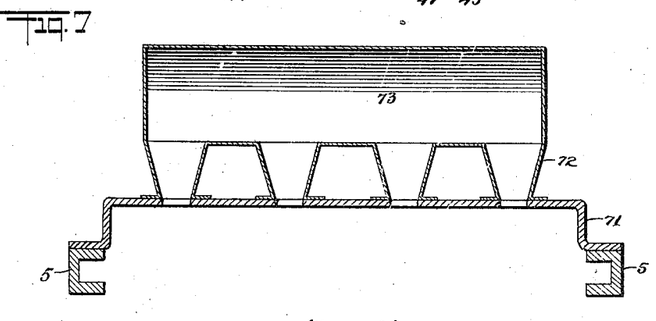
Figure 7 is a section on the line 7—7 of Figure 1.
Figure 12:
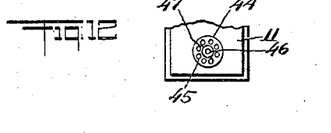
Figure 12 is in part a bottom view thereof.

The finished product can be delivered to a runway 146, and transferred to a tray 147. Each carrier stops for an instant as it is about to leave the rails 5, in the position shown at the left of Figures 1 and 2; the bar 25 being inclined somewhat, so that the disks with the powder molded thereon can be easily pushed off upon the runway 146. Each cake will consist of a disk 9 with the powder 148 thereon, molded and pressed into the shape of a circular layer, spherically rounded on top, and held fast by the adhesive from the box 11.

The motor may be mounted on the bars 149, supported by the framework 1.

Having described my invention, what I believe to be new and desire to secure and protect by Letters Patent of the United States is:

1. A machine for working comminuted or pulverized material into the form of cakes or wafers, comprising parts for supplying and admeasuring a predetermined quantity of such material to a base, and parts for pressing the material into adhesion with the base through the action of an adhesive agent which secures the material and base together, said parts comprising members for rotatably engaging the material and molding it into shape on said base.

2. A machine for working comminuted or pulverized material into the form of cakes or wafers, comprising parts for supplying a base, parts for admeasuring and heaping upon said base a predetermined quantity of such material, and parts for causing the material to become attached to the base through the action of an adhesive, whereby the cake and the base together constitute the finished product, said parts comprising members for rotatably engaging the material on said base and molding it into shape.

3. A carrier comprising a projection, a plate having an opening with a sleeve projecting from the rim of the opening and encircling said projection, and resilient arms on the carrier to engage the edges of the plate and hold it in position.

4. The combination of a hopper, an endless belt moving through the hopper, pulleys at the ends of the hopper to engage the belt, gearing for intermittently rotating the pulleys, a gate attached to the hopper above the belt, a rack on said gate and a rotatable shaft having a pinion to mesh with the rack to raise or lower the gate.

5. A machine for working comminuted or pulverized material into the form of cakes or wafers, comprising parts for applying an adhesive to a base and then heaping upon the adhesive on said base an apportioned quantity of said material, and parts some of which are rotatable for molding and compressing said material into the required shape on said base, whereby the cake and the base are united together.

6. In a machine of the class described, a container for an adhesive, said container having an outlet, and parts for actuating the container to cause it to move said outlet into contact with a disk, whereby the disk can be made to stick to said outlet, and receive a portion of the adhesive and simultaneously be carried by the container from one position to another.

7. A receiver having a movable section to vary the capacity thereof, parts to depress said section, and an element to remove the excess contents of the receiver while said section is in depressed position.

8. In a machine of the class described, a conveyor, a carrier to be moved by the conveyor, the carrier being transverse to the conveyor, and a reciprocating member having a pawl in position to engage each carrier in turn for intermittently operating the conveyor.

9. In a machine of the class described, a hopper, an endless belt moving through the hopper to discharge the contents thereof and gearing comprising a wheel having teeth over a portion of its circumference for intermittently actuating the belt to deliver a predetermined quantity of the contents of the hopper.

10. In a machine of the class described, the combination of a magazine, a member having a recess in its top adjacent the discharge end of said magazine to deliver said disks therefrom, a container for an adhesive having an outlet, the member being movable away from the magazine and the container movable to carry said outlet into contact with a disk delivered by said member, whereby said disk can be made to stick to said outlet and receive a portion of the adhesive and be simultaneously removed from said member.

11. A hopper, an endless belt movable through the hopper to discharge the contents thereof, spouts to receive the contents of said hopper, a receiver to be filled with contents through said spouts, said receiver comprising a movable section, parts for depressing said section, and an element beneath the hopper to remove the excess contents of the receiver when said section is depressed.

12. In a machine of the class described, a head, members having concave lower ends fixed to the head, a second head, members having concave lower ends rotatably mounted in the second head, connections for raising and lowering said heads, and gearing for turning said rotatable members while said heads are elevated and depressed.

13. The combination of rails or guides, carriers engaging said guides, conveyors to move the carriers along the rails intermittently, a magazine for disks, a member to deliver said disks from said magazine, a container for adhesive having an outlet, said container being movable to carry said outlet into contact with said disks and apply a portion of adhesive to the top of said disks while simultaneously removing the disks from said member, rods for disengaging disks from the container and depressing them into the carriers, a hopper for supplying pulverized material to the disks in said carriers, an element for removing the excess contents of said carriers, and dies to mold the material into shape upon the disks and simultaneously compress it into adhesion with same.

14. The combination of a container for an adhesive, said container having an outlet nozzle, and a plunger projecting to the exterior of the container through said nozzle, the nozzle having delivery openings, means to move the plunger to release from said nozzle, objects supplied with adhesive by said container.

15. A machine for working comminuted or pulverized material into the form of cakes or wafers, comprising parts for supplying and admeasuring a predetermined quantity of such material to a base, and parts for molding said material into shape upon said base and pressing the material into adhesion with the base through the action of an adhesive agent which secures the material and base together.

16. A machine for working comminuted or pulverized material into the form of cakes or wafers, comprising parts for supplying a base, parts for admeasuring and heaping upon said base a predetermined quantity of such material, and parts for molding said material on said base into shape and causing the material to become attached to the base through the action of an adhesive, whereby the cake and the base together constitute the finished product.

17. A receiver comprising a boss, a sleeve encircling said boss, and normally extending beyond the end of said boss, and a projecting part attached to the sleeve to enable the sleeve to be moved on the boss.

18. A machine for working comminuted or pulverized material into the form of cakes or wafers, comprising parts for applying an adhesive to a base and then heaping upon the adhesive on said base an apportioned quantity of said material, and parts for molding said material into the required shape on said base, whereby the cake and the base are united together.

19. A machine for working comminuted or pulverized material into the form of cakes or wafers, comprising parts for supplying and admeasuring a predetermined quanity of such material to a base, parts for molding said material into shape upon said base, and pressing said material into adhesion with the base through the action of an adhesive agent which secures the material and base together, and parts for receiving the cake and the base as a finished product.

In testimony whereof, I have signed my name to this specification this 8th day of June, 1922.

LUIGI D'ONOFRIO.